United States Patent [19]

Meidan

[11] Patent Number: 5,007,146
[45] Date of Patent: Apr. 16, 1991

[54] PLASTIC PROFILE FASTENER

[76] Inventor: Daniel Meidan, 90 Elise Terrace, North York, Ontario, Canada, M2R 2X1

[21] Appl. No.: 521,493

[22] Filed: May 10, 1990

[51] Int. Cl.⁵ .................. A44B 21/00; B65D 33/14
[52] U.S. Cl. ........................... 24/683; 24/587; 383/63
[58] Field of Search .......... 24/683, 587, 576, 297, 24/389; 383/63, 65, 89, 93; 411/508

[56] References Cited

U.S. PATENT DOCUMENTS

| | | | |
|---|---|---|---|
| 3,372,442 | 3/1968 | Ishimatsu | 24/587 |
| 4,561,109 | 12/1985 | Herrington | 24/587 |
| 4,578,813 | 3/1986 | Ausnit | 383/63 |
| 4,682,366 | 7/1987 | Ausnit et al. | 24/576 |
| 4,706,297 | 11/1987 | Ausnit | 383/89 |
| 4,791,710 | 12/1988 | Nocek et al. | 24/587 |
| 4,792,983 | 12/1988 | Allegre | 383/93 |
| 4,840,334 | 6/1989 | Kikuchi | 411/508 |
| 4,846,585 | 7/1989 | Boeckmann et al. | 383/65 |

FOREIGN PATENT DOCUMENTS 1092453 11/1967 United Kingdom ............ 24/587

*Primary Examiner*—Victor N. Sakran
*Attorney, Agent, or Firm*—Kenneth M. Garrett

[57] ABSTRACT

Plastic profile fasteners comprising a first member having an elongated groove profile and a second member having a complementary elongated projection receivable in the groove; the first member is provided with a plurality of axially spaced apart bridges between the groove walls, and the second member with notches in which the bridges are receivable. The bridges reinforce the groove wall, and coact with the notches to prevent relative axial movement of the fastener members.

14 Claims, 7 Drawing Sheets

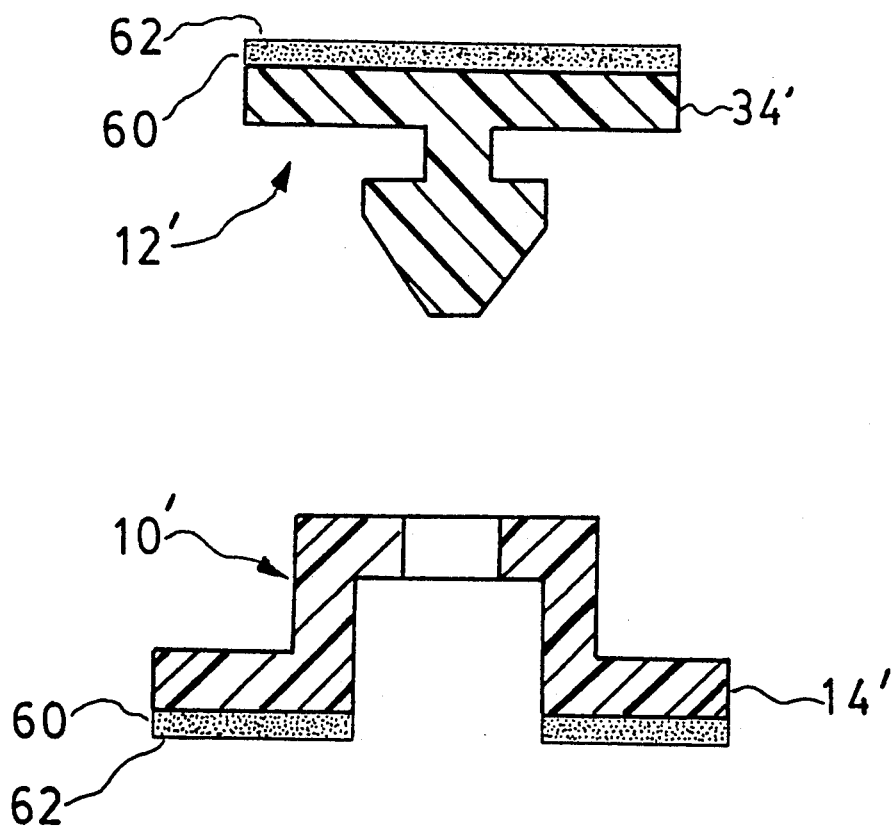
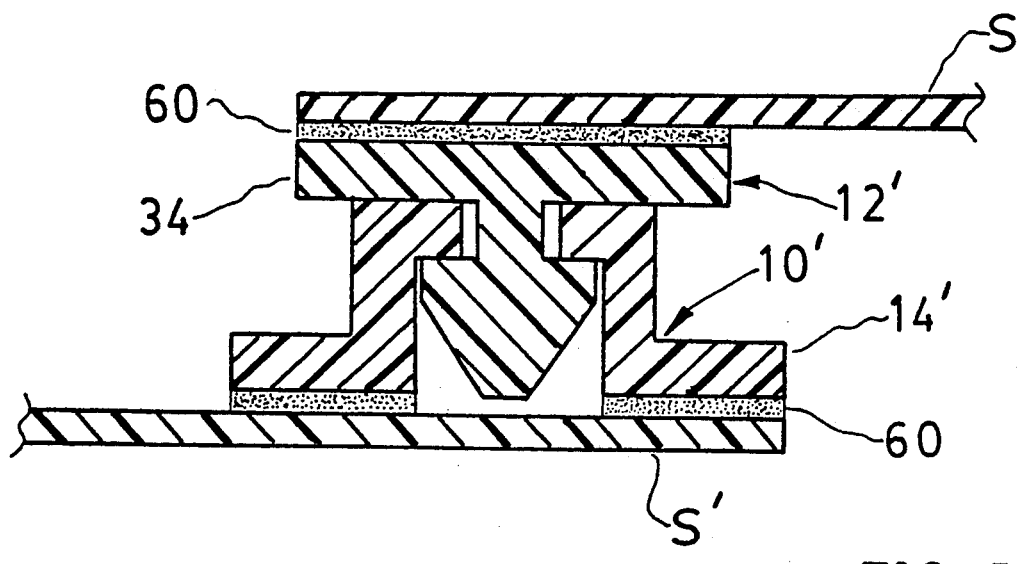
FIG-4
FIG-5

PLASTIC PROFILE FASTENER

FIELD OF INVENTION

This invention relates to resilient, extruded plastic fasteners of a type having mechanically mating profiles which can be pressed into inter-locking relationship, and to methods for the manufacture thereof.

BACKGROUND OF INVENTION

Fasteners of the foregoing type comprise a first, female member having a continuous groove formed longitudinally therealong, and a second male member having a continuous, complementary longitudinally shouldered profile which is pressed into the groove to be latched therein. Depending upon the particular configuration of the groove and shoulder, the members may be releasably or non-releasably fastened together.

Releasable fasteners of the above type are exemplified in the following patents

| U.S. Pat. No. | 4,561,109 | Herrington |
|---|---|---|
| " | 4,578,813 | Ausnit I |
| " | 4,706,297 | Ausnit II |
| " | 4,846,585 | Boeckmann et al |

Non-releasable fasteners of the above type are exemplified in the following patents

| U.S. Pat. No. | 4,791,710 | Nocek et al |
|---|---|---|
| " | 4,792,983 | Allegne et al |

In all of the foregoing patents, both the extruded male and female members have a continuous, uniform cross-section therealong. While suited for many purposes, both the releasable and non-releasable fasteners of the above type will permit the relative longitudinal movement of the two fasteners members.

Additionally, while a strong latching force may be generated between the members, they may nevertheless be peeled apart due to the tendency of the walls forming the groove of the female member to splay transversely when subject to peeling forces.

Fasteners of the mating profile type are commonly applied to relationally opposed surfaces, by which term is meant surfaces wherein the attached closure members will find themselves contiguously opposed in the normal course of events, prior to their being fastened together. This situation will commonly arise when the closure elements are applied at the mouth of a plastic bag for example. Such bags are commonly stored together in large quantities pending their use, and it is not desirable that the fasteners close together adventitiously. In the above referred to Nocek et al patent, various means are suggested for hindering the joining of contiguous mating closure members. In the Ausnit II patent, the problem is largely overcome by staggering the closure members. A similar expedient is noted in U.S. Pat. No. 4,838,708, Holcomb et al, although in this instance the closure members are not of the mating profile type, being joinable by adhesive rather than by mechanical means. In both Ausnit II and Holcomb et al closure of the members can only be effected by deforming the substrate to which at least one of the members is attached.

SUMMARY OF INVENTION

In accordance with one aspect of my invention, mechanical fasteners of the extruded profile type comprise a female member having longitudinal groove therealong and a male member having a male projection therealong engageable in the groove; the members are further provided with a plurality of axially spaced apart, matable elements, each matable element having a transverse wall component, the transverse elements cooperating to restrict relative axial movement of the members.

Conveniently the male member is provided with a plurality of hiati therealong, and the female member with a corresponding plurality of elements matable therewith.

Suitably the axially spaced matable elements of the female member connect laterally opposed sides of the wall of the groove, thereby reinforcing the groove wall and resisting any tendency to splay open.

Optionally, the matable elements formed on the male and female members may, in addition to preventing relative axial movement of the members, be shaped to provide a latch between the elements. Such latch will act to further reduce the possibility of the peeling apart of the male and female members under stress, and may be in addition to or in replacement of the axially aligned shoulder components normally provided in the prior art profile fasteners.

In accordance with a preferred form of the invention, the hiati take the form of transversely aligned notches in communication with each lateral side of the male projection so as to form a plurality of tooth like projections along the male member. Also suitably, the female member is formed as a unitary extrusion including a pair of transversely spaced apart axially extending walls interconnected by a bight, and the bight is provided at intervals therealong with apertures to form cooperating openings for the teeth of the male member. The material of the bight between the apertures forms a plurality of transverse bridges between the opposing walls forming the groove. Such bridges are received in the notches to coact therewith and restrict the longitudinal relative movement of the female and male members. The bridges further have the advantage of reinforcing the groove by restricting the lateral deformation thereof under stress. Accordingly, the female member may provide a much greater latching force on the male member than in the prior art matable fastener devices, and will additionally restrict the tendency of such fasteners to peel open under stress.

Suitably and preferably, the male and female members are formed as unitary extrusions, although under certain circumstances it is contemplated that multiple parts may be integrated together.

In accordance with the preferred embodiment, both the female member and male member include a base for securing the members to a substrate. Suitably the base of the female member is provided with a longitudinal slot therein coextensive with the groove walls, in communication with the groove.

In use, the base of both the male member and the female member may be secured to a substrate in any convenient manner, for example by the use of adhesives or by fusing thereto. In accordance with another aspect of the invention, at least one of the base members is provided with an axially extending live hinge coextensive with the member. Where only one member is provided with the live hinge, the members will be mounted on relationally opposed surfaces in staggered relationship with the closure elements facing in the same direction, whereby they will not mate adventitiously during storage. Only the hinge portion remote from the profile associated therewith is secured to the substrate, the other hinge portion thereby being free to rotate to assume a mating position with the other profile at the time of use.

Where the base members of both the male and female elements are provided with a live hinge, the distance separating the live hinge portion from the associated profile of the female member will differ from that of the male member. Accordingly, the two hinged members will be secured to relationally opposed surfaces in opposite directions, and will also be staggered, again avoiding their adventitious mating during storage.

In accordance with the method aspect of the invention, the female and male members are formed as extrusions having a constant cross-section, and the hiati and apertures are subsequently formed therein, for example in a simple punching operation, although other means as will be known in the art may also be employed.

These foregoing objects and aspects of the invention, together with other objects, aspects and advantages thereof will be more apparent from the following description of a preferred embodiment thereof, taken in conjunction with the following drawings.

BRIEF DESCRIPTION OF THE DRAWINGS

FIG. 4 is a transverse cross-section of a slightly modified version of a matable fastener in accordance with the invention, with the male member superimposed above the female member;

FIG. 5 is similar to FIG. 4, and shows the members in their engaged position, with a non-relationally opposed substrate attached to each for joining thereby;

DESCRIPTION OF THE PREFERRED EMBODIMENT

Figure 1:
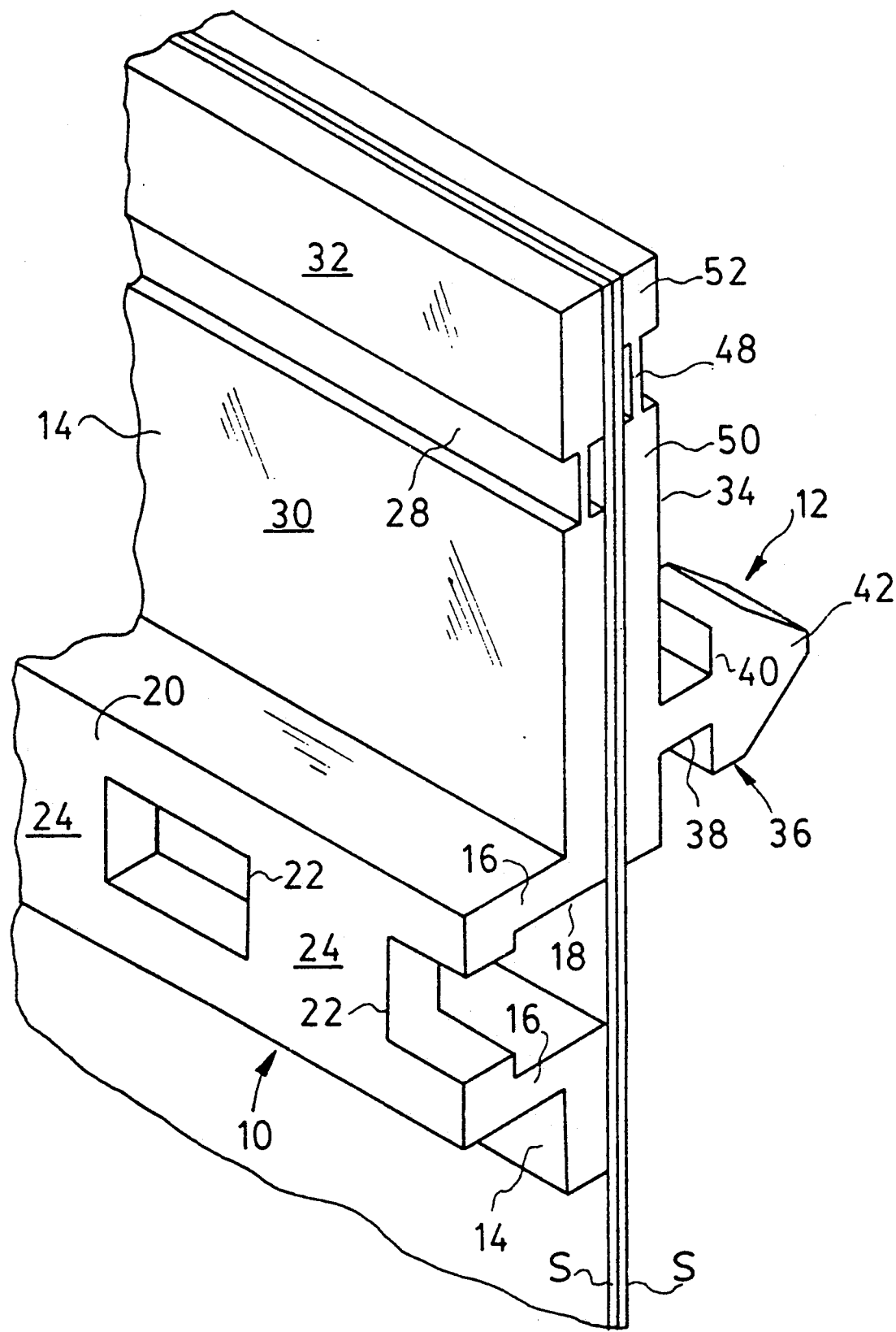
FIG. 1 shows in isometric view matable fasteners in accordance with the invention secured to relationally opposed substrate in an open, storage position, broken to indicate a repeating structure of indefinite length.
Figure 2:
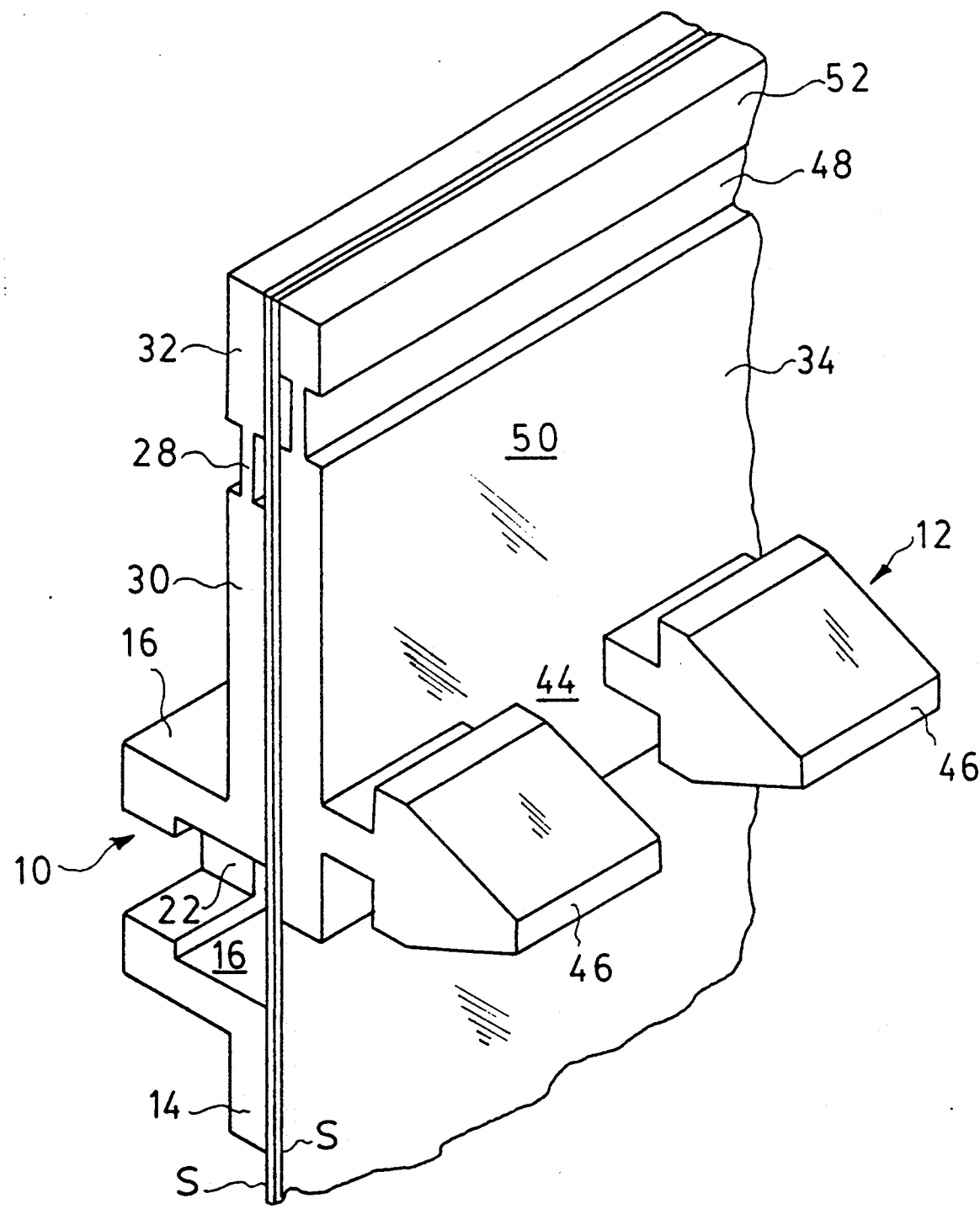
FIG. 2 is similar to FIG. 1, as seen from the other side.
Figure 3:
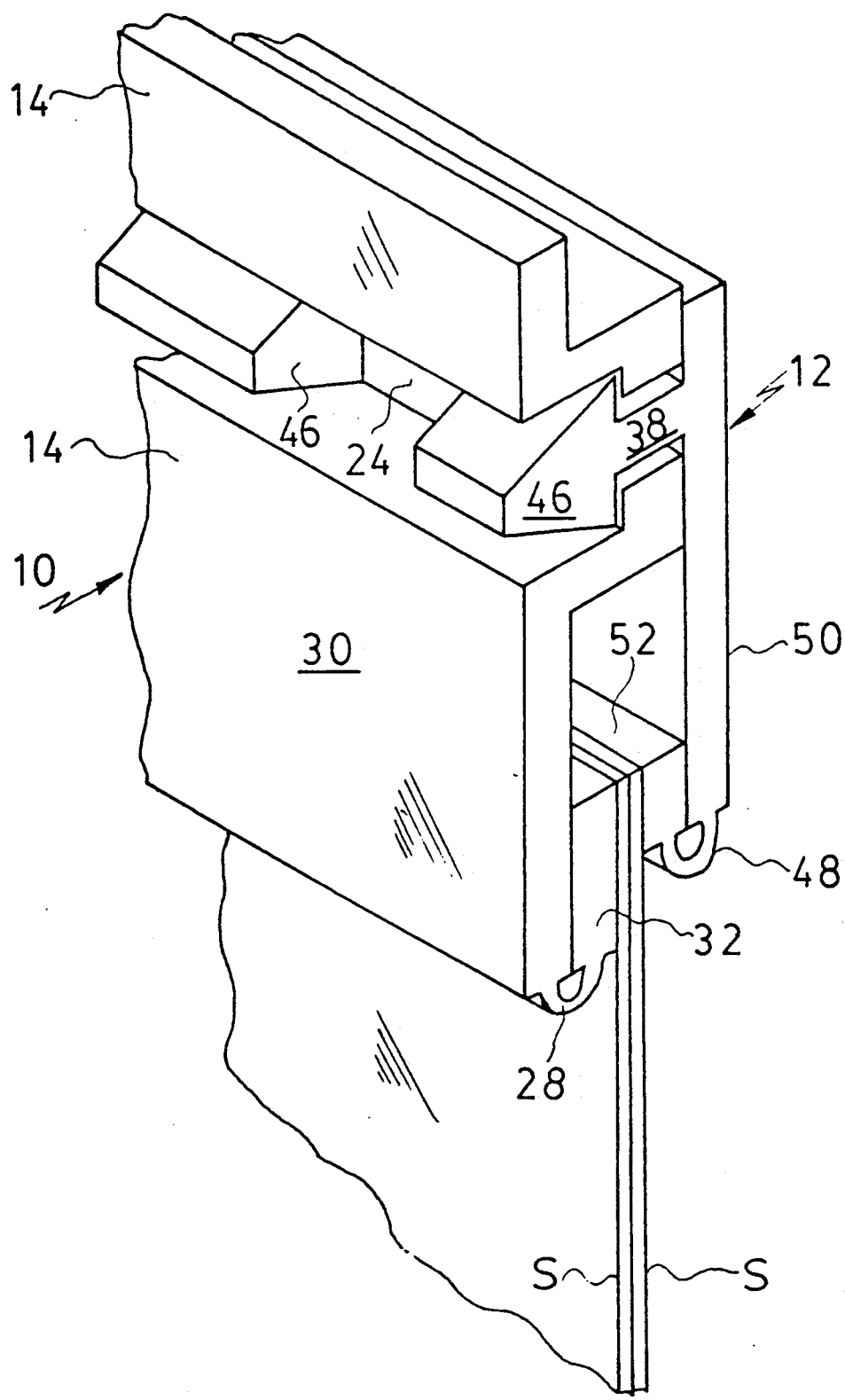
FIG. 3 is similar to FIG. 1 but shows the members in their closed, mated condition.

Referring initially to FIGS. 1-3 in detail, a female extruded plastic fastener member is identified therein by the numeral 10, and a matable male member by the numeral 12. Female member 10 comprises a base 14 and upstanding therefrom a pair of similar walls 16 extending in a direction defining the axis of the fastener. Walls 16 are transversely spaced apart to define a groove 18 therebetween and are joined at their distal end by a bight 20 coextensive therewith. A slot 22 extends through base 14 in communication with groove 18 along the length thereof. Bight 20 is provided with a plurality of apertures 22 in communication with groove 18, separated by bridges 24. While the aperture 22 shown on the right hand end of FIG. 1 is seen as being incomplete, this is done primarily for illustrative purposes to reveal more structural detail of the closure element. However, in practise there will be a large member of apertures along a typical closure, and the length of the closure may usually selected without regard as to whether the end aperture is complete or not.

Base 14 on one transverse side of slot 22 has an axially aligned neck 28 formed continuously therealong, in effect forming a live hinge and dividing base 14 into female member first hinge leaf portion 30 remote from walls 16 and female member second hinge leaf portion 32 adjacent to walls 16.

Male member 12 comprises a base 34 and upstanding therefrom an axially aligned wall 36 having a uniform thickness at proximal portion 38, an increased thickness at shoulders 40, and which subsequently tapers in an arrow-head cross-section 42. Wall 36 is interrrupted periodically at notches 44, in effect forming a plurality of spaced apart teeth 46 upstanding from base 34. Base 34 on one transverse side of wall 36 has an axially aligned neck 48 formed continuously therealong, in effect forming a live hinge and dividing base 34 into a male member first hinge leaf portion 50 and male member second hinge leaf portion 52.

In a typical use of the fastener for securing together relationally opposed surfaces identified in FIGS. 1-3 by letter S, members 10 and 12 are secured to the surfaces by first hinge leaf portions 30 and 50 by any convenient method, with the male and female members pointing in opposed directions. The width of the second leaf hinge portions 32 and 52 differs, that of the female member 12 being shown as larger than that of the male member 14, although this is entirely arbitrary. Members 10 and 12 located on surfaces S such that when the members are respectively rotated about live hinges 28 and 48, teeth 46 will be in alignment with apertures 22, and correspondingly bridges 24 will be in alignment with notches 44, to permit the engagement thereof.

As best seen in FIGS. 1 and 2, when female and male members 10, 12 are secured to surfaces S prior to rotation of the elements about hinges 28 and 48, teeth 46 and apertures 22 will be horizontally spaced apart. Accordingly, when the articles of which surfaces S forms a part are stored in superposition, adventitious joining of the closure elements will not occur.

It should be appreciated that the precise shape of the mating elements provided by teeth 46, apertures 22, bridges 24 and notches 44 may be varied widely accordingly to the degree of releasability or otherwise desired.

In accordance with the embodiment of FIGS. 4 and 5, the only change relative to the embodiment of FIGS. 1-3 is in regard to the base thereof. In this second embodiment a female member 10' has a base 14' devoid of any hinged element; similarly male member 12' has a base 34' devoid of any hinged elements. Each base 14', 34' is conveniently provided with an adhesive coating 60 thereon covered by a release paper 62. As best seen in FIG. 5, the embodiment of this invention is suited for joining non-relationally opposed surfaces S' to which it may be secured by means of adhesive coating 60 or by any other convenient means. It should be understood that the fastener of this embodiment may also be used for joining relationally opposed surfaces, although there will be an obviously greater danger of adventitious mating occurring.

Figure 6:
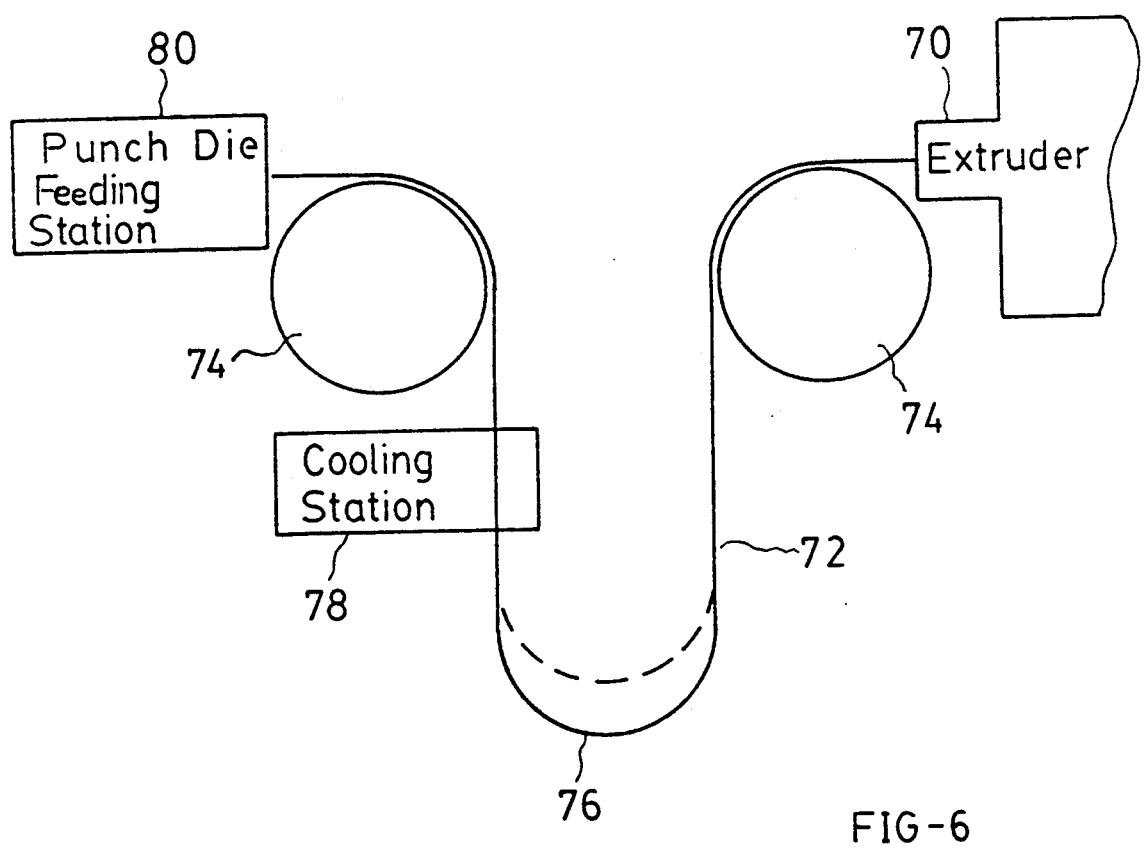
FIG. 6 is a schematic view of the continuous extrusion of the mating profiles and the location of a punch/or notching station.
Figure 7:
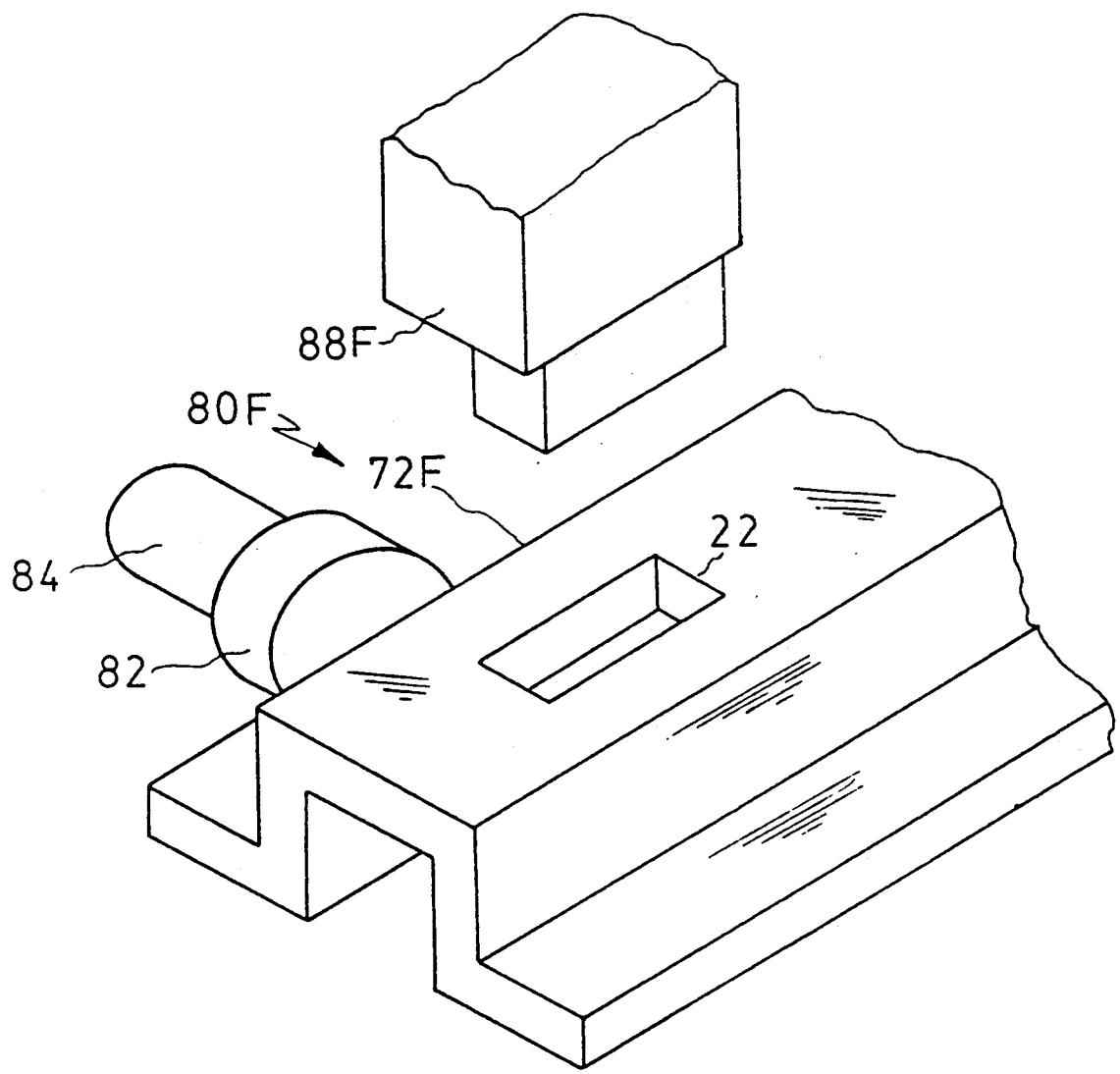
FIG. 7 shows in schematic view a punching station.
Figure 8:
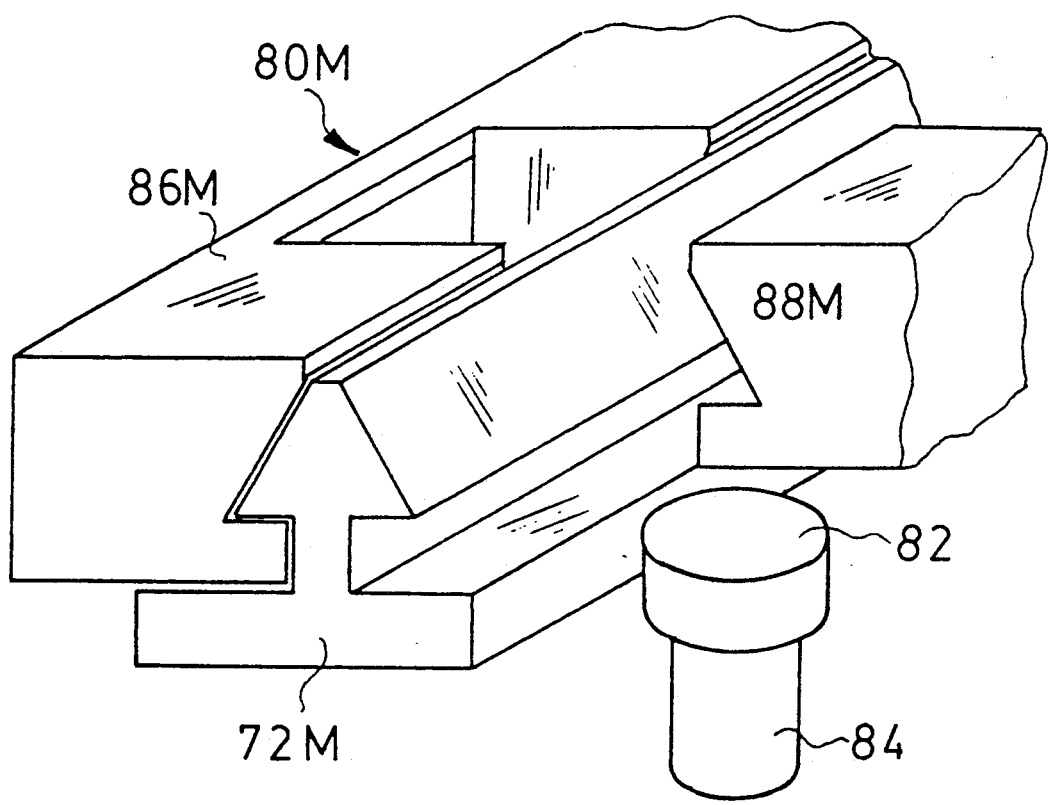
FIG. 8 shows in schematic view a notching station.

In accordance with the method of the invention, and with reference to FIGS. 6-8, extrusion 72 having a constant cross-section thereacross is found at an extrusion head 70. Extrusion 72 is transported by rollers 74, and forms a gravity loop 76 therebetween. A cooling station 78 is located about one leg of loop 76. Extrusion 72 then passes to a punch and die feeding station 80.

Extrusion 72 may be in the form of a female precursor 72F, seen in FIG. 7, or a male percursor 72M, seen in FIG. 8. Referring first to FIG. 8, station 80M for use with male extrusion 72M comprises a feeding wheel 82 driven be stepper motor 84 for advancing the extrusion in stepped increments, a die 86M and complementary punch 88M. Following each advance of extrusion 72M, punch 88 is actuated to form a notch in extrusion 72M similar to notch 44 in male member 12 more particularly described hereinabove in regard to FIGS. 1-3.

In an analogous manner, and with reference to FIG. 7, station 80F for use with a female extrusion 72F comprises feeding wheel 82 and stepper motor 84. A punch 88 F is shown located above extrusion 72F, and has a complementary die (not shown) associated therewith. Following each advance of extrusion 72F, punch 88F is actuated to punch an aperture 22 in the female extrusion, one such aperture being shown therein.

It will be apparent that many changes may be made to the illustrative embodiment, while falling within the scope of the invention and it is intended that all such changes be covered by the claims appended hereto.

I claim:

1. In a plastic profile fastener of the type comprising a female member having an axially elongated groove profile and a male member having a complimentary axially elongated male projection for engagement within said groove profile;
   the improvement wherein said groove profile is provided with a plurality of male fastener elements and wherein said male projection is provided with a plurality of female fastener elements for engagement with said male elements when said male projection is engaged in said groove profile, said male and female fastener elements each presenting a cooperating surface component transverse to the axis of said fastener serving to limit the relative axial movement of said members.

2. A plastic profile fastener as defined in claim 1, wherein said female fastener elements comprise hiati formed in said male projection.

3. A plastic profile fastener as defined in claim 2, wherein said hiati comprise notches in said male projection.

4. A plastic profile fastener as defined in claim 2, wherein said male member is a unitary extrusion.

5. A plastic profile fastener as defined in claim 1, wherein said female member comprises a pair of transversely spaced apart axially aligned walls defining said groove profile and wherein said male fastener elements comprise bridges linking said walls together at axially spaced apart intervals therealong.

6. A plastic profile fastener as defined in claim 5, wherein said walls are joined therealong by a bight, and wherein said bight is provided with a plurality of apertures therethrough, said bridges at least in part defining said apertures.

7. A plastic profile fastener as defined in claim 6, wherein said female member is formed as a unitary extrusion.

8. A plastic profile fastener as defined in claim 5, wherein said female member includes a base from which said pair of walls are upstanding, and wherein said base is provided with an axially aligned slot therealong in communication with said groove.

9. A plastic profile fastener as defined in claim 8, wherein said base is formed with an axially aligned live hinge therealong.

10. A plastic profile fastener as defined in claim 1, wherein said female member and said male member each include a base portion, and wherein at least one base portion is provided with an axially extending live hinge therealong.

11. A plastic profile fastener as defined in claim 10, wherein said female member and said male member are each provided with a live hinge therealong, and wherein said live hinge associated with said groove is laterally spaced apart therefrom by a distance different to that from which said live hinge is spaced from its associated male projection.

12. In a plastic profile fastener of the type comprising a female member having an axially elongated groove profile and a male member having a complimentary axially elongated male projection for engagement with said groove profile,
   the improvement wherein said members are provided with a plurality of cooperating matable elements, each said matable element having a transverse wall component engageable with the transverse wall component of an adjacent matable element to restrict relative axial movement of said members.

13. A plastic profile fastener as claimed in claim 12, wherein said matable elements of said female member have a male nature and wherein said matable elements of said male member have a female nature.

14. Method for forming an hermaphroditic fastener comprising extruding a first plastic profile comprising a pair of transversely spaced apart walls joined by a bight, and forming a plurality of axially spaced apart apertures through said bight and concomitantly leaving a corresponding plurality of bridges extending between said spaced apart walls, said apertures and said bridges respectively defining female and male fastening elements;
   extruding a second profile having an axially extending male projecting member; servering said male projecting member to form a plurality of axially spaced apart notches therethrough and concomitantly leaving a corresponding plurality of teeth; said teeth and said notches respectively forming male and female fastening elements cooperatively engageable with said female and male fastening elements of said first profile extrusion when formed with said apertures.

* * * * *